United States Patent [19]
Oka et al.

[11] Patent Number: 5,695,326
[45] Date of Patent: Dec. 9, 1997

[54] COMPRESSOR FOR A REFRIGERATION MACHINE HAVING A THRUST BEARING

[75] Inventors: Hideto Oka, Shiga-ken; Shigeru Muramatsu, Kusatsu; Hirotsugu Fukuoka, Kusatsu; Hiroshi Matsunaga, Kusatsu; Masahiro Tsubokawa, Kusatsu, all of Japan

[73] Assignee: Matsushita Electric Industrial Co., Ltd., Japan

[21] Appl. No.: 655,883

[22] Filed: May 31, 1996

[30] Foreign Application Priority Data

Jun. 5, 1995 [JP] Japan .................................. 7-137692

[51] Int. Cl.$^6$ .................... F04C 18/04; F04C 29/00; F16C 17/04; F16C 33/12
[52] U.S. Cl. ................. 418/55.1; 418/270; 417/902; 384/912; 384/913
[58] Field of Search ................. 418/55.1, 270; 384/912, 913; 417/902; 415/229

[56] References Cited

U.S. PATENT DOCUMENTS

| | | | |
|---|---|---|---|
| 3,902,770 | 9/1975 | Heep et al. | 384/912 |
| 5,007,810 | 4/1991 | Fraser, Jr. et al. | 418/55.1 |
| 5,072,707 | 12/1991 | Takai et al. | 384/420 |
| 5,356,277 | 10/1994 | Yamaguchi et al. | 384/913 |
| 5,387,461 | 2/1995 | Kamiya et al. | 384/912 |
| 5,427,511 | 6/1995 | Caillat et al. | 418/55.1 |

FOREIGN PATENT DOCUMENTS

| | | | |
|---|---|---|---|
| 61-8487 | 1/1986 | Japan | 418/55.1 |
| 975075 | 11/1964 | United Kingdom | 384/912 |

*Primary Examiner*—John J. Vrablik
*Attorney, Agent, or Firm*—Parkhurst, Wendel & Burr, L.L.P.

[57] ABSTRACT

A compressor for a refrigeration machine is provided without any problems of reduction in the life of a thrust bearing structure even when a substitutive coolant not containing any chlorine is used. In the compressor for a refrigeration machine having a thrust bearing made of steel for supporting a thrust load applied to a drive shaft, a thrust bearing surface made of a material different from that of the drive shaft is formed in the thrust bearing by means of a surface treatment. Alternatively a washer defining the thrust bearing surface may be surface treated to provide a material different from that of the drive shaft. The washer may also be made of a material different from that of the drive shaft. According to the the present invention, even when a boundary lubricating state is produced between the drive shaft and the thrust bearing surface sticking is prevented. As a result, the life of the thrust bearing structure of the drive shaft can be made longer and a problem of reduction in the life of the thrust bearing structure can be avoided even when a substitutive coolant not containing any chlorine is utilized.

9 Claims, 5 Drawing Sheets

COMPRESSOR FOR A REFRIGERATION MACHINE HAVING A THRUST BEARING

BACKGROUND OF THE INVENTION

1. Field of the Invention

The present invention relates to a compressor for a refrigeration machine. More particularly, the invention relates to a compressor for a coolant machine suited to use a mixed coolant made by mixing at least one or more than two kinds selected from a group of carbon fluoride hydrogen coolants, that is, a substitutive coolant.

2. Background of the Art

Conventionally, a compressor for a refrigeration machine includes, in addition to a radial type roller bearing for supporting a force produced in a drive shaft when a compressing mechanism compresses a coolant, a thrust bearing part for supporting a thrust load so as to prevent backlash of the drive shaft in its axial direction.

A big load is placed on the roller bearing. Thus, as materials for a track wheel and a rolling body, various special steels, including a high carbon chrome steel typically used as a bearing steel as disclosed in JISG4805, a carbon tool steel as disclosed in JISG4401, and a chrome molybdenum steel as disclosed in JISG4105 are used. The roller bearing must be quenched and tempered before use.

A big load is not placed between the drive shaft and the thrust bearing. Thus, the drive shaft may be made of a general steel and the thrust bearing part is further hardened by means of a heat treatment by utilizing a portion of a fixing member also made of a general steel.

As a coolant, chlorofluorocarbon R12 or R22 has been conventionally used. Chlorofluorocarbon has been widely used as an ideal coolant for many years, since it is chemically stable, incombustible and nontoxic compared with sulfur dioxide or methyl chloride previously used as a coolant.

Recently, however, chlorofluorocarbon has been found to contain chlorine atoms in molecules that contribute to destruction of the ozone layer. Thus, efforts have been expended on the development and use of a substitutive fluorocarbon.

As a highly practical coolant, there has been recommended HFC (Hydro Fluoro Carbon) which does not contain any chlorine (see "Hydraulic and Pneumatic Technology" issued by Japan Industry Publishing Co., Ltd. in June, 1994).

SUMMARY OF THE INVENTION

Use of the substitutive coolant described above has not provided sufficient lubricity as in the case of the chlorofluorocarbon, since it does not contain any chlorine. This necessitates stricter sliding requirements and in the above-mentioned simple thrust bearing structure of the drive shaft and the thrust bearing part, wear and tear easily occur between these parts, shortening the life of the thrust bearing structure of the drive shaft. This propensity to abrade may be attributed to the fact that a sliding state between the thrust bearing surface and the drive shaft becomes a boundary lubricant state in which a portion of an oil film has been cut due to insufficient lubricity provided by the substitutive coolant, whereby agglutination is produced in this boundary lubricant part because both are made of steel having cooperative metal structures.

Such a reduction in the life of the thrust bearing structure of the drive shaft becomes a problem, especially when this is used for one which should not need any maintenance over a long time like the compressor of a hermetically sealed type. This problem arises because that the life of the thrust bearing structure determines the life of the compressor and thus, such a type lacks practicality.

The present invention was made to solve the above-stated problems. An object of the invention is to provide a compressor for a refrigeration machine including a thrust bearing structure having an extended life even when a substitutive coolant not containing any chlorine is used.

The compressor for a refrigeration machine of the invention uses a mixed coolant made by mixing at least one or more than two kinds selected from a group of carbon fluoride hydrogen coolants, an electric motor and a compressing mechanism driven by a drive shaft made of steel linked with this electric motor are placed in a hermetically sealed canister and a thrust bearing made of steel is provided for supporting a thrust load produced in the drive shaft.

In order to achieve such an object, according to a first aspect of the invention, there is formed a thrust bearing surface made of a material different from that of the drive shaft on the thrust bearing by means of a surface treatment.

According to a second aspect of the invention, there is formed a thrust bearing surface made of a material different from that of the drive shaft by means of a surface treatment on a washer fitted in the thrust bearing.

For the surface treatment carried out in accordance with the first and second aspects, any of nitride, boron, or nickel can be used.

According to a third aspect of the invention, there is formed a thrust bearing surface defined by a washer made of a material different from that of the drive shaft fitted in the thrust bearing. The washer can be made of a nonferrous metal or a resin.

Each aspect of the invention is effective for a scroll type compressing mechanism and can be applied similarly to an upright type in which the drive shaft is placed vertically and a horizontal type in which the drive shaft is placed laterally.

In the structure of the compressor for the refrigeration machine according to the first aspect of the invention, when the compressing mechanism works because of the rotation of the drive shaft, a freezing cycle is performed by repeating sucking and compressing of a coolant. The coolant used here does not destroy the environment, since it is a chlorine free mixed coolant made by mixing at least one or more than two kinds selected from the group of carbon fluoride hydrogen coolants.

Lubricity is not provided, because the coolant does not contain chlorine and even when a boundary lubricant state is produced in the drive shaft and the thrust bearing surface of the thrust bearing for supporting a thrust load produced therein, sliding contact is between the different materials of the thrust bearing surface of the thrust bearing and the drive shaft. This makes it possible to prevent agglutination of these parts in the boundary lubricant state part and prolong the life of the thrust bearing structure part of the drive shaft. A problem shortening of the life of the thrust bearing structure never occurs even with the substitutive coolant not containing chlorine.

Furthermore, the thrust bearing surface of the thrust bearing can be formed only by partly applying a surface treatment to a conventional member constituting the thrust bearing. This prevents costs from being increased.

In the structure of the compressor for the refrigeration machine according to the second aspect of the invention, even if the thrust bearing surface made of a material different from that for the drive shaft is provided, it is only necessary to apply a surface treatment to the washer. This reduces time and labor over the first aspect of the invention, and is thus more cost effective. Further, this enables the traditional machine to be easily improved.

In the structure of the compressor for the refrigeration machine according to the third aspect of the invention, even if the thrust bearing surface made of a material different from that of the drive shaft is provided, it is only necessary to fit the washer made of a material different from that of the drive shaft in the thrust bearing part. This allows further simplification of the structure compared with the second aspect of the invention.

DETAILED DESCRIPTION OF THE PREFERRED EMBODIMENTS

Now, each embodiment of the compressor for the refrigeration machine of the invention will be described with reference to FIGS. 1 to 6.

FIGS. 1 to 4 show the hermetically sealed type compressor of the first embodiment of the invention.

Figure 1:
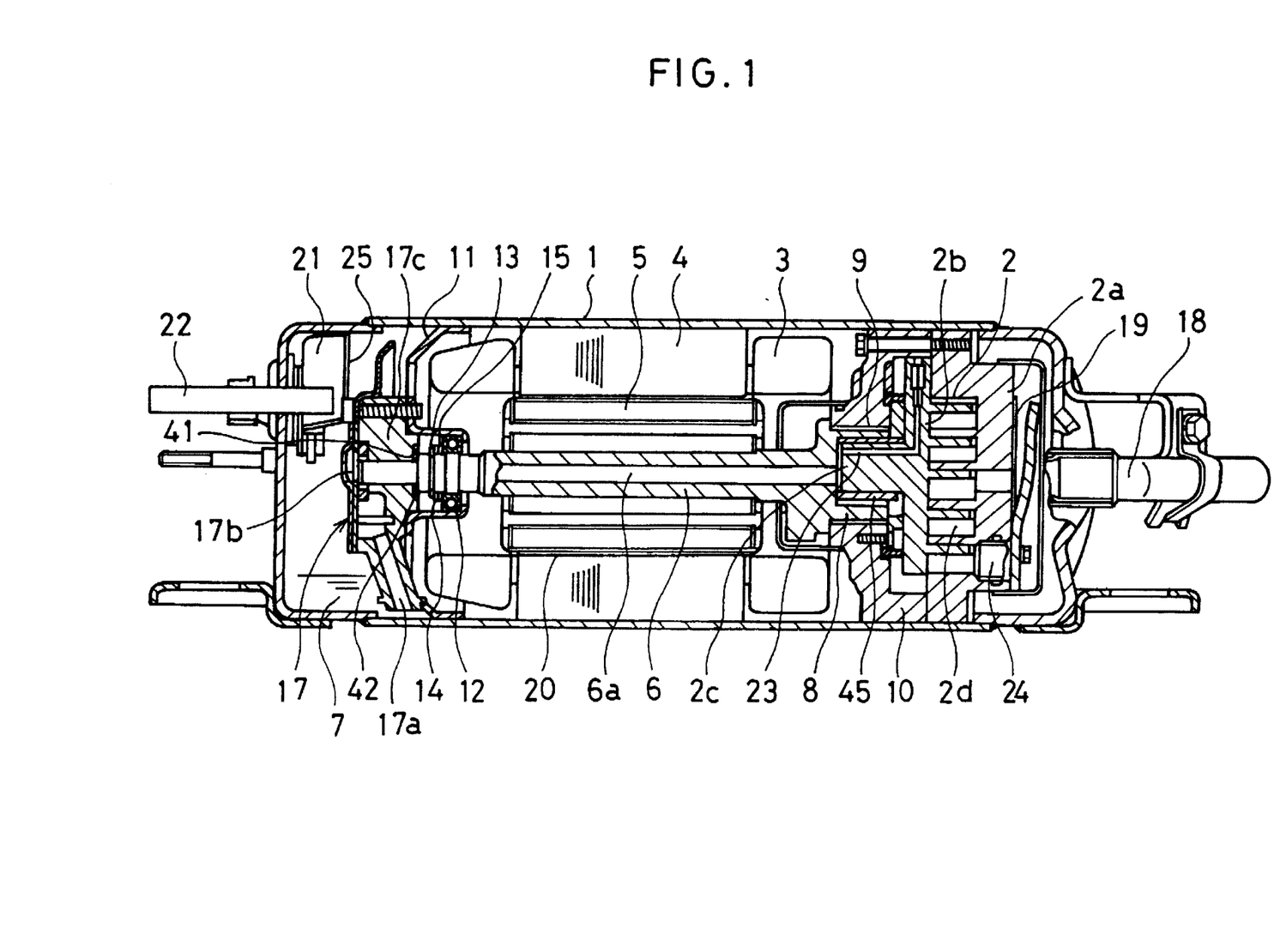
FIG. 1 is a sectional view illustrating a compressor for a refrigeration machine of a first embodiment of the invention.

Referring to FIG. 1, there is provided a compressing mechanism 2 for sucking in and compressing a coolant in an end of the inside of a tightly sealed canister 1 as a laterally set type pressure canister. A stator 4 of an electric motor 3 driven by this compressing mechanism 2 is located in the center of the tightly sealed canister 1 and fixed to the inner surface of the side wall of the canister 1. A crank shaft 6 as a drive shaft for the compressing mechanism 2 is connected to a rotor 5 corresponding to the stator 4 of the electric motor 3 and a rotary shaft thereof is placed almost laterally.

This crank shaft 6 is supported by a main spindle bearing member 10 with a main spindle 8 in an end of the compressing mechanism 2 side fixed by a screw to the compressing mechanism 2 and the other end in a side opposite to that for the main spindle 8 is supported by a sub-bearing member 11 located in the other end of the tightly sealed canister 1 and fixed to the inner surface of the side wall of the canister 1. A part for supporting the main spindle 8 of the main spindle bearing member 10 is a slide bearing 9 while a part for supporting the other end of the crank shaft 6 of the sub-bearing member 11 is a radial type roller bearing 12.

The slide bearing 9 and roller bearing 12 support a force generated in the crank shaft 6 when the compressing mechanism 2 compresses a coolant by means of a rotary motion of the crank shaft 6. A big load is placed on the roller bearing 12 and thus this is made of a material selected from such special steels as a high carbon chrome steel, a carbon tool steel, a chrome molybdenum steel and others described previously.

A washer 14 with its motion in a reverse main spindle direction restricted by a snap ring 13 is provided in the crank shaft 6 adjacent to the roller bearing 12. A wave type washer 15 made of a metal is provided between the inner race of the roller bearing 12 and the washer 14 and the wave type washer 15 is charged in an axial direction by the roller bearing 12 and washer 14 so as to be provided with an elastic force.

The lower part from the sub-bearing member 11 of the tightly sealed canister 1 to the end side is a lubricating oil reservoir 7. The upper part is a discharge chamber 21 for discharging a coolant gas out of the tightly sealed canister 1 and a lubricating oil pump 17 driven by the other end of the crank shaft 6 is provided and fixed to a side facing the lubricating oil reservoir 7 of the sub-bearing member 11. The lubricating oil pump 17 has a suction port 17a opened in the lubricating oil reservoir 7 and a discharge port 17b linked with a lubricating hole 6a formed longitudinally from the other end of the crank shaft 6 to a slide bearing 45. Therefore, lubricating oil discharged by the lubricating pump 17 is first supplied to the slide bearing 9 and lubricates this part. The slide bearing 9 is linked with the inside of the tightly sealed canister 1 and that of the compressing mechanism 2 via a passage 23 and a space of each part. This also allows lubricating oil to be supplied to each sliding part of the compressing mechanism 2 for lubrication.

Figure 2:
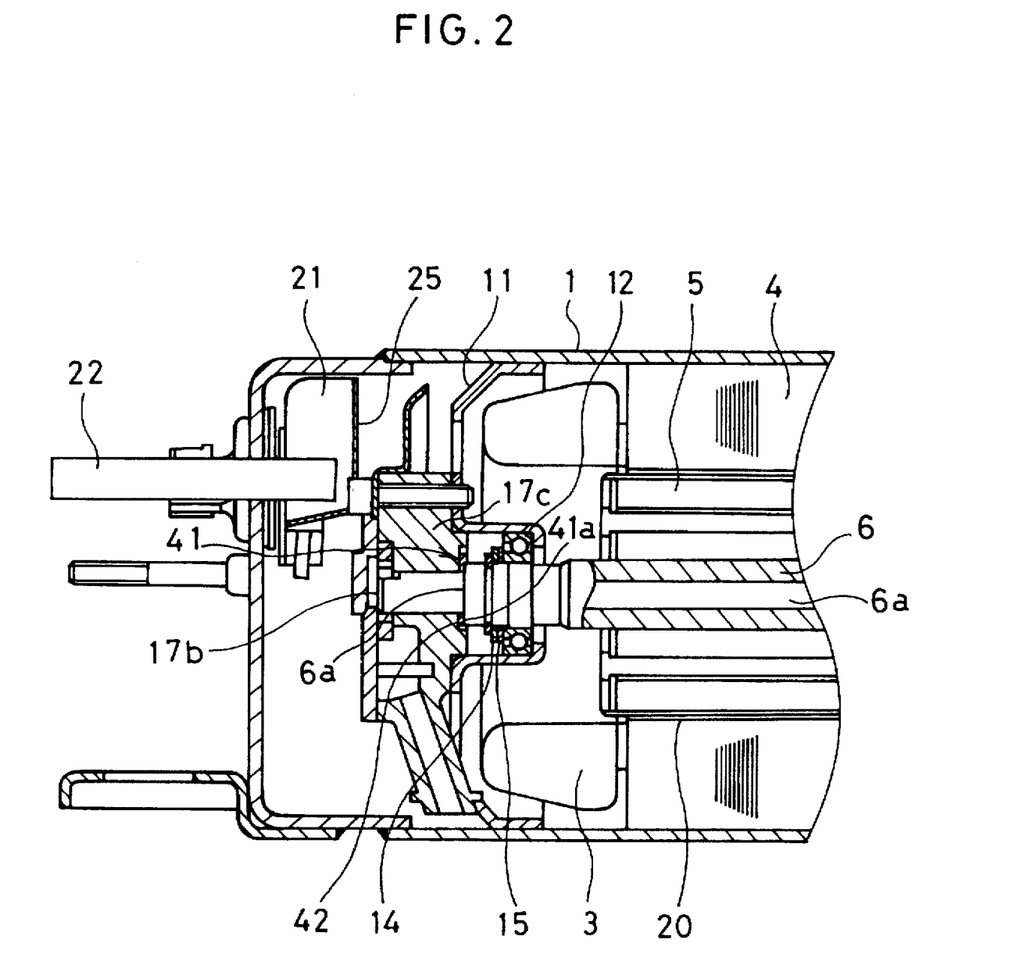
FIG. 2 is an expanded view of main parts of the compressor illustrated in FIG. 1.
Figure 3:
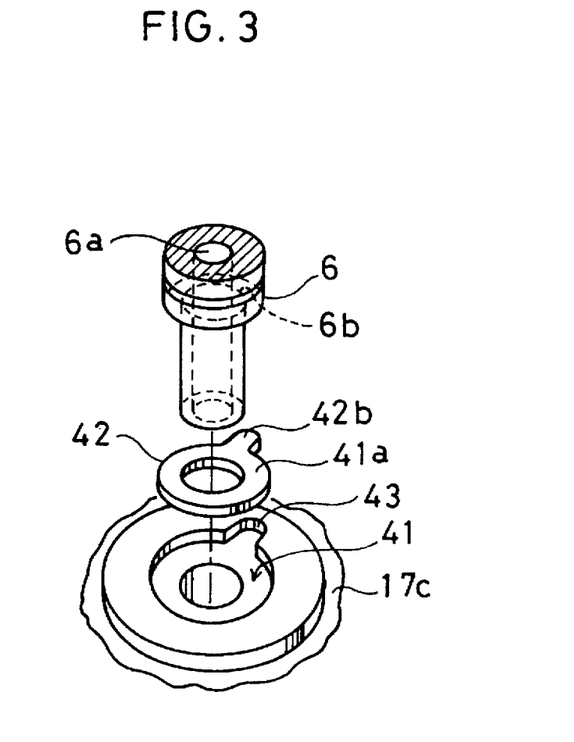
FIG. 3 is an exploded perspective view of a thrust bearing structure part of the first embodiment.

There is provided a thrust bearing 41 for the crank shaft 6 like that shown in FIGS. 1, 2 and 3 around the part of the casing 17c for the lubricating pump 17 penetrated by the other end of the crank shaft 6. By sliding and bringing a step surface 6b facing the other end side of the crank shaft 6 into contact with a thrust bearing surface 41a formed thereby, backlash is prevented from being produced in the axial direction of the crank shaft 6.

Thus, application of a load to the thrust bearing surface 41a is limited to the level which enables prevention of backlash in the axial direction of the crank shaft 6. In the first embodiment of the invention, however, by locating the center of the rotor 5 of the electric motor 3 inclined toward the lubricating oil pump 17 side more than the center of the stator 4 by a specified amount, the crank shaft 6 formed integrally with the rotor 5 is pulled to the compressing mechanism 2 by means of magnetic attraction between the stator 4 and the rotor 5, making it possible to further reduce a thrust load placed by the crank shaft 6 to the thrust bearing surface 41a. Selection of this arrangement is up to the user.

The compressing mechanism 2 includes a fixed scroll 2a and a movable scroll 2b. The passive shaft 2c of the movable scroll 2b is placed in the eccentric position of the main spindle 8 via another slide bearing 45 and lubricating oil must be supplied to this part as well. Several pockets 2d are formed between the fixed scroll 2a and the movable scroll 2b. When the movable scroll 2b is turned due to the rotation of the crank shaft 6, the sockets 2d receive coolant gases from the suction tube 18 of the compressor when reaching a suction port 24 provided in the outer periphery of the fixed scroll 2a and move to a discharge port 19 provided in the center of the fixed scroll 2a. This movement gradually reduces the volumes of the pockets 2d and compresses the received coolant gases. The gases are then discharged when the pockets 2d reach the discharge port 19. The discharged coolant gases are discharged out of the discharge port 19 into the tightly sealed canister 1, led to the discharge chamber 21 through a passage 20 in the electric motor side and discharged out of the compressor through a discharge tube 22 provided in this chamber 21.

Therefore, when the compressing mechanism 2 functions because of the rotary motion of the crank shaft 6, a freezing cycle can be executed by repeating sucking in and compressing of the coolant gases.

For the coolant gases, a mixed coolant made by mixing at least one or more than two kinds selected from the group of carbon fluoride hydrogen coolants is employed as a substitutive coolant. Since this doesn't contain any chlorine, there will be no possibility of destruction of the environment. As a specific example of such a coolant, HFC or FC having a boiling point close to that of chlorofluorocarbon HCFC22 may be considered.

Lubricating oil is ester oil soluble with the coolant gases. Lubricating oil supplied to the compressing mechanism 2 and into the hermetically sealed canister 1 from the part of the slide bearing 9 comes into contact with the coolant gases sucked into and compressed by the compressing mechanism 2 and discharged into the canister 1 by passing through the same passage for the gases, dissolved and mixed into the coolant gases and thereby caused to flow therewith. As a specific example of such lubricating oil, fatty acid ester or carbonic acid ester may be considered.

As discussed above, lubricating oil is mixed in the coolant gases and these flow together and thus the coolant gases moving to the discharge chamber 21 after passing through the passage 20 in the electric motor side contain lubricating oil, carry this oil with their own flow and then supply it to the roller bearing 12. In this way, the roller bearing 12 can be properly lubricated.

The discharge chamber 21 is formed by dividing the inside of the hermetically sealed canister 1 with an obstruction plate 25. The coolant gases about to flow into the discharge tube 22 are separated into gases and liquid due to their clashing with the obstruction plate 25, lubricating oil contained in the coolant gases is properly separated and recovered in the lubricating oil reservoir 7 located in the lower part.

As stated above, the substitutive coolant does not contain any chlorine and thus the same level of lubricity as the traditional chlorofluorocarbon will not be provided. This makes sliding requirements harder and in the conventional simple thrust bearing structure of the crank shaft 6 and the thrust heaping 41, because of insufficient lubricity provided by the substitutive coolant, a sliding state between the thrust bearing surface 41a and the crank shaft 6 easily becomes a boundary lubricating state in which a portion of an oil film has been torn. In the part of this boundary lubricating state, agglutination occurs because of the cooperative metal structures of both parts made of steel, shortening the life of the thrust bearing structure of the crank shaft 6. Such a reduction in the life of the thrust bearing structure is a serious problem reducing its practicality, particularly in the case of the hermetically sealed type compressor that should run for a long time without any maintenance. For this reason reason, the life of the thrust bearing structure of the crank shaft 6 determines the life of the entire compressor.

Figure 4:
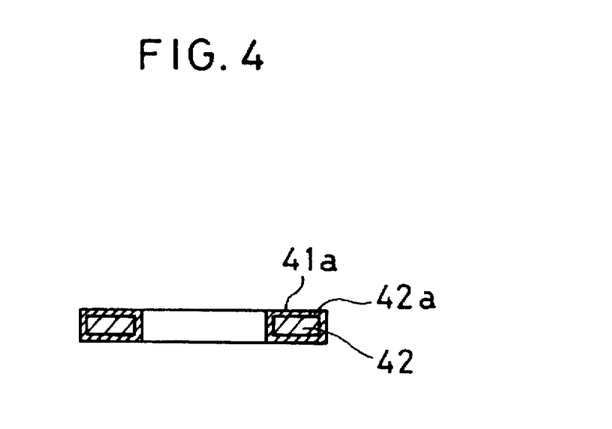
FIG. 4 is a sectional view of a washer used in the thrust bearing structure part of the first embodiment.

In order to solve such a problem, in the embodiment of the invention, a washer 42 is fitted in the thrust bearing 41 and a thrust bearing surface 41a made of a material different from that of the crank shaft 6 is formed by means of a surface treatment. FIG. 4 illustrates a processed layer 42a formed on the surface of the washer 42 by means of the surface treatment. This processed layer 42a forms the thrust bearing surface 41a made of a material different from that for the crank shaft 6.

Therefore, even when a boundary lubricating state is generated between the crank shaft 6 and the thrust bearing surface 41a of the thrust bearing 41 for supporting a thrust load applied thereto because of insufficient lubricity provided due to noninclusion of chlorine in the coolant, sliding occurs between the different materials forming the thrust bearing surface 41a of the thrust bearing 41 and the crank shaft 6. This makes it possible to prevent sticking of these parts in the boundary lubricating state part, and make the life of the thrust bearing structure of the crank shaft 6 longer thereby increasing the life of the compressor when the substitutive coolant not containing any chlorine is used.

Furthermore, as it is only necessary to apply a surface treatment to the washer 42 fitted in the thrust bearing 41 even while the thrust bearing surface 41a made of a material different from that for the crank shaft 6 is provided, it is possible to reduce time and labor, prevent cost increases and easily improve the conventional machine.

The inventors of the present invention have found by way of experimentation that for the surface treatment, use of nitride, boron, or nickel is effective.

If nitride is utilized, a iron nitride $Fe_2N_3$ layer of 3 μm to 5 μm is formed as the processed layer 42a of the washer 42, realizing a material different from the crank shaft 6. If boron is employed, a $FeB_3$ layer is similarly formed as the processed layer 42a, which is different in material from the crank shaft 6. The same result is obtained by using nickel plate.

As shown in FIG. 3, the washer 42 has an integrally formed projecting piece 42b protruding outward from a portion of its outer periphery. By engaging this projecting piece 42b with a rotation catch recessed part 43 formed by bulging a portion of recessed part to the outer periphery by the thrust bearing 41 of the casing 17c, unintentional rotation of the washer 42 is prevented. This allows the washer 42 to slide only with the crank shaft 6. Therefore, it is enough to apply the surface treatment only to the side of the washer 42 opposite the step surface 6b of the crank shaft 6.

As discussed above with respect to the embodiment, the invention is effective when the compressing mechanism 2 is a scroll type. However, application of the invention is not limited to this and it can be applied to the compressing mechanism 2 of other types. Moreover, in the embodiment, the crank shaft 6 is a horizontally set type, i.e., the shaft is placed laterally. However, its arrangement is not limited to this.

By making the washer 42 itself of a material different from that of the crank shaft 6, shortening of the life of the thrust bearing structure of the crank shaft 6 can be similarly prevented. This implementation is also within the scope of the invention.

Figure 5:
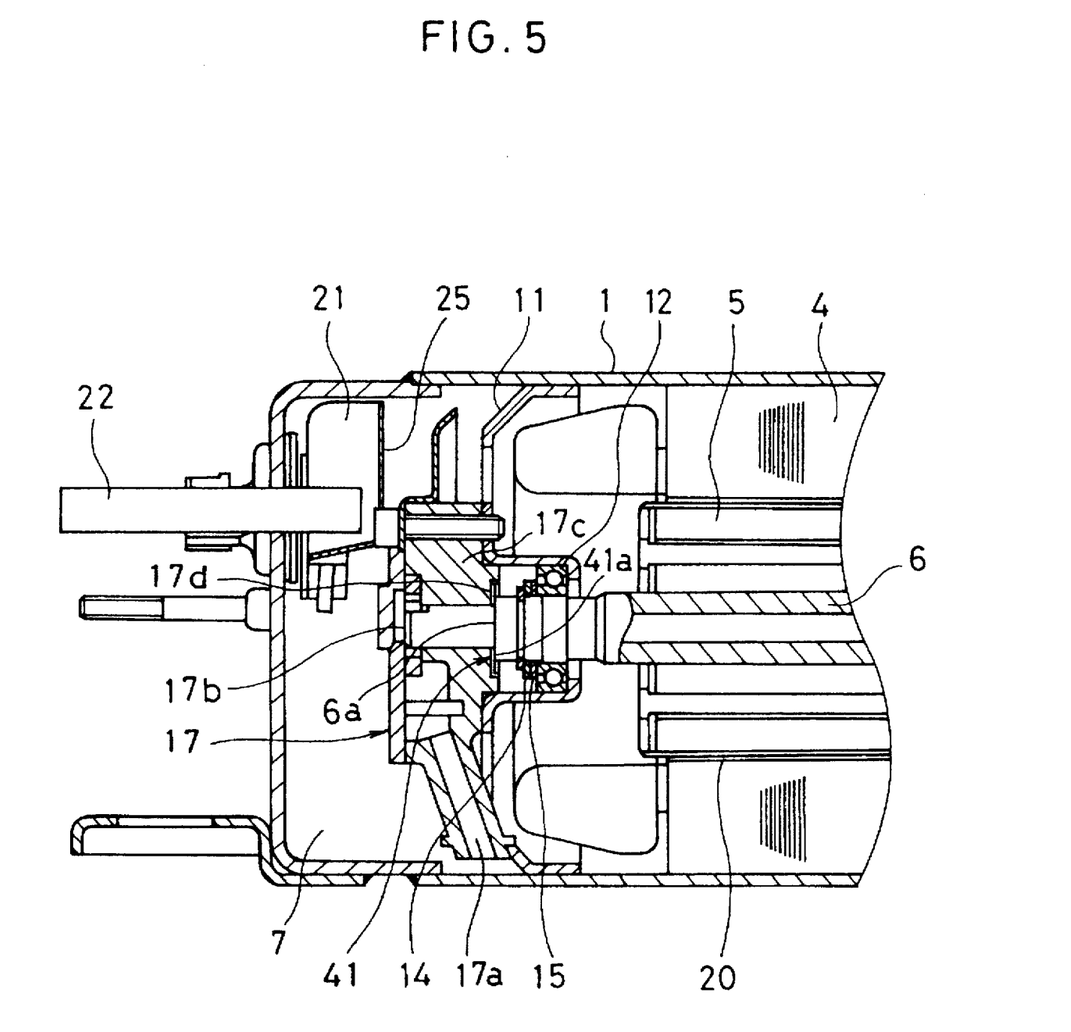
FIG. 5 is a sectional view of main parts of a compressor for a refrigeration machine of a second embodiment of the invention.

FIG. 5 illustrates a second embodiment of the invention.

The second embodiment is different from the first in that a thrust bearing surface 41a made of a material different from that for the crank shaft 6 is directly formed on a thrust bearing 41 provided in the casing 17c of a lubricating oil pump 17 by means of a surface treatment. In the second embodiment, the same reference numerals and signs are attached to the same members as in the first and repetition of the same descriptions will be avoided.

The surface treatment for forming the thrust bearing surface and effects of its action in the embodiment are similar to those in the first embodiment. The thrust bearing surface can be formed only by applying the surface treatment partially to the casing 17c as a traditional member constituting the thrust bearing 41 and thus there will be no increases in the numbers of members and assembling steps and in costs. In FIG. 5, 17d represents a processed layer formed by means of the surface treatment.

Figure 6:
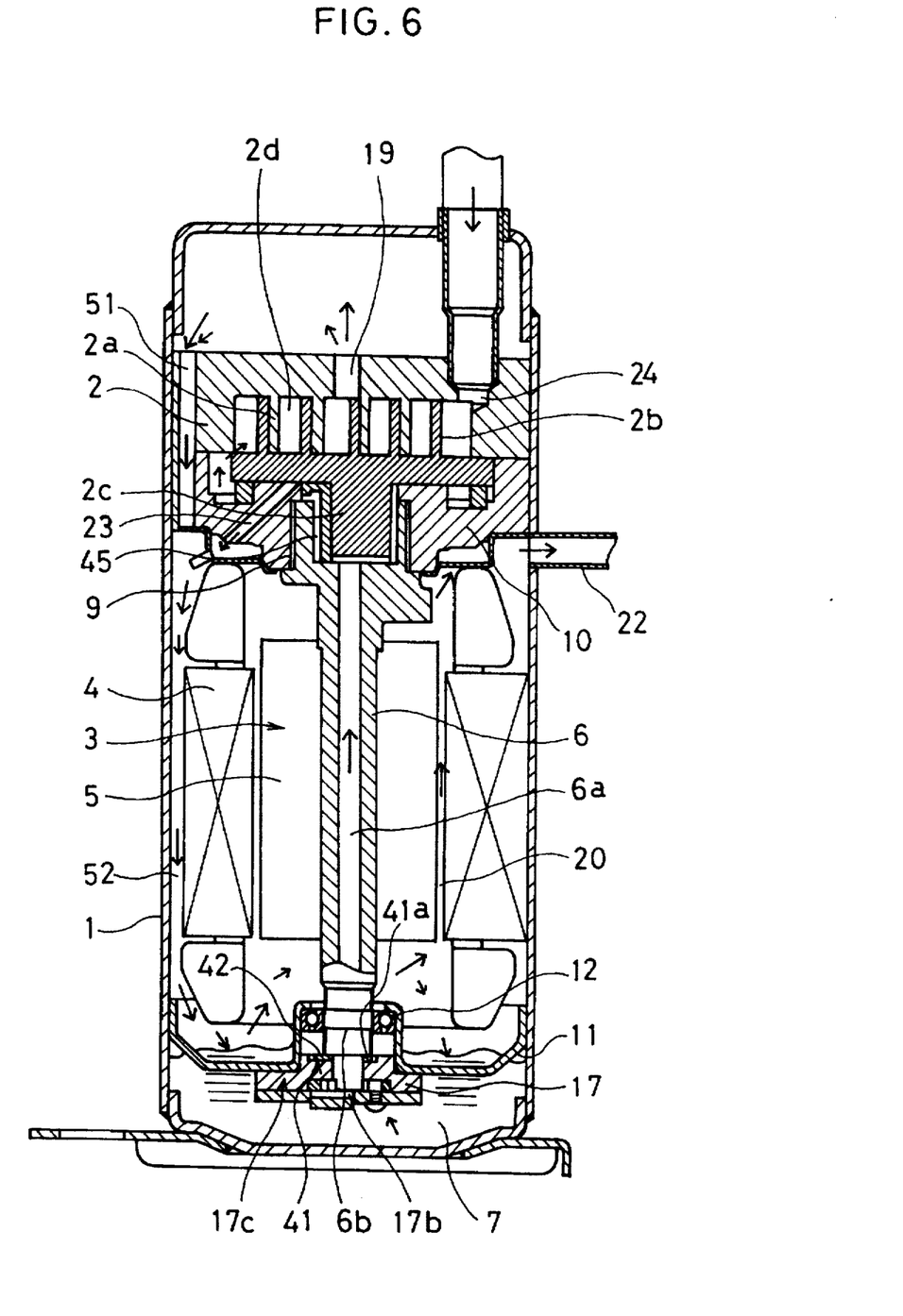
FIG. 6 is a sectional view of main parts of a compressor for a refrigeration machine of a third embodiment of the invention.

FIG. 6 illustrates a third embodiment of the invention.

An upright type is adopted for the crank shaft 6, i.e., the shaft is placed vertically. The crank shaft 6 can slide and come into contact with the thrust bearing surface 41a of a thrust bearing 41 and stably rotate without any backlash produced in its axial direction. In addition, the center position of the rotor 5 of an electric motor 3 is leaned upward more than the center position of a stator 4 and the rotor 5 is pulled to the thrust bearing surface 41a side by means of magnetic attraction from the stator 4, thereby increasing the backlash preventing effect.

A lubricating oil reservoir 7 is formed in the lower part space below the sub-bearing member 11 of a hermetically sealed canister 1, a discharge tube 22 for a coolant is provided in a side portion immediately below a main spindle bearing member 10, a compressed coolant and lubricating oil discharged out of a compressing mechanism 2 are returned to the lower part of the tightly sealed canister 1 through notched parts 51 and 52 provided in the other side part opposite the discharge tube 22 in the outer periphery of the compressing mechanism 2 and the stator 4 and the coolant having reached the lower part of the electric motor 3 is led to the discharge tube 22 through a passage 20 in the side of the electric motor. Other structures and effects are the same as in the first embodiment and thus description of these will be omitted.

As discussed above, in the structure of the compressor for the refrigeration machine according to the first aspect of the invention, when the compressing mechanism functions due to the rotation of the drive shaft, the freezing cycle is executed by repeating sucking in and compressing of the coolant. The coolant used is a mixed coolant made by mixing at least one or more than two kinds selected from the group of carbon fluoride hydrogen coolants, does not contain any chlorine and thus there will be no possibility of its destroying the environment.

Since the coolant does not contain any chlorine, sufficient lubricity is not provided. However, even when a boundary lubricating state is generated between the drive shaft and the thrust bearing surface of the thrust bearing for supporting a thrust load produced in the drive shaft, since sliding occurs between the different materials forming the thrust bearing surface of the thrust bearing and the drive shaft, sticking of these parts in the boundary lubricating state part can be prevented. As a result, the life of the thrust bearing structure of the drive shaft can be made longer and there will be little possibility of reduction in the life thereof even when the substitutive coolant not containing any chlorine is utilized.

Furthermore, the thrust bearing surface of the thrust bearing can be formed only by applying the surface treatment partially to the traditional member constituting the thrust bearing and thus cost increases can be prevented.

In the structure of the compressor for the refrigeration machine according to the second aspect of the invention, although the thrust bearing surface made of a material different from that of the drive shaft is provided, it is only necessary to apply the surface treatment to the washer fitted in the thrust bearing. As a result, time and labor can be reduced more than the compressor according to the first aspect of the invention and it is possible to easily improve the traditional machine.

For the surface treatments carried out in accordance with the first and second aspects of the invention, use of nitride, boron or nickel plate is effective.

Lastly, in the structure of the compressor for the refrigeration machine according to the third aspect of the invention, although the thrust bearing surface made of a material different from that of the drive shaft is provided, it is only necessary to fit the washer made of a material different from that of the drive shaft in the thrust bearing. As a result, the structure can be made simpler than that according to the second aspect of the invention. In this case, for the washer, use of a noniron metal such as nickel, or a resin such as PPS, polyamide and phenol is effective.

What is claimed is:

1. A compressor for a refrigeration machine using a mixed coolant, comprising:

a hermetically sealed canister;

an electric motor placed in the hermetically sealed canister;

a compressing mechanism placed in the hermetically sealed canister and driven by a steel drive shaft connected to the electric motor; and a steel thrust bearing for supporting a thrust load applied to the drive shaft, wherein a surface portion of the thrust bearing is surface treated with a layer of material that is different than the material of the drive shaft, and the layer of material consists of a material from the group consisting of a nitride, a boride, and nickel.

2. A compressor for a refrigeration machine according to claim 1, wherein the compressing mechanism is a scroll type.

3. A compressor for a refrigeration machine according to claim 1, wherein the drive shaft is either an upright type in which the drive shaft is placed vertically or a horizontal type in which the drive shaft is placed laterally.

4. A compressor for a refrigeration machine using a mixed coolant, comprising:

a hermetically sealed canister;

an electric motor placed in the hermetically sealed canister;

a compressing mechanism placed in the hermetically sealed canister and driven by a steel drive shaft connected to the electric motor;

a steel thrust bearing for supporting a thrust load applied to the drive shaft; and a washer fitted in the thrust bearing, said washer having a surface portion surface treated with a layer of material that is different from the material of the drive shaft, the layer of material consisting of a material from the group consisting of a nitride, a boride, and nickel.

5. A compressor for a refrigeration machine according to claim 7, wherein the compressing mechanism is a scroll type.

6. A compressor for a refrigeration machine according to claim 7, wherein the drive shaft is either an upright type in which the drive shaft is placed vertically or a horizontal type in which the drive shaft is placed laterally.

7. A compressor for a refrigeration machine using a mixed coolant, comprising;

a hermetically sealed canister;

an electric motor placed in the hermetically sealed canister;

a compressing mechanism placed in the hermetically sealed canister and driven by a steel drive shaft connected to the electric motor;

a steel thrust bearing for supporting a thrust load applied to the drive shaft; and a washer fitted in the thrust bearing, said washer being comprised of a resin.

8. A compressor for a refrigeration machine according to claim 7, wherein the compressing mechanism is a scroll type.

9. A compressor for a refrigeration machine according to claim 7, wherein the drive shaft is either an upright type in which the drive shaft is placed vertically or a horizontal type in which the drive shaft is placed laterally.

* * * * *

UNITED STATES PATENT AND TRADEMARK OFFICE
CERTIFICATE OF CORRECTION

PATENT NO. : 5,695,326
DATED : December 9, 1997
INVENTOR(S) : Hideto OKA, Shigeru MURAMATSU, Hirotsugu FUKUOKA, Hiroshi MATSUNAGA, and Masahiro TSUBOKAWA It is certified that error appears in the above-indentified patent and that said Letters Patent is hereby corrected as shown below:

In column 8, lines 53 and 56, change "claim 7" to --claim 4--.

Signed and Sealed this

Twenty-fifth Day of August, 1998

Attest:

BRUCE LEHMAN

Attesting Officer

Commissioner of Patents and Trademarks